United States Patent Office 3,009,774
Patented Nov. 21, 1961

3,009,774
PROCESS OF MAKING SODIUM-RARE EARTH FLUORIDES
Arthur Linz, New York, N.Y., assignor to Molybdenum Corporation of America, New York, N.Y., a corporation of Delaware
No Drawing. Filed June 9, 1960, Ser. No. 34,868
7 Claims. (Cl. 23—88)

The present invention relates to a novel and improved process for the formation of sodium-rare earth metal fluorides, such as sodium-cerium fluoride and other sodium-rare earth metal fluorides in which the rare earth oxide is a mixture of the oxides of the rare earth elements, generally in their naturally occurring ratios.

The present invention has for its object the provision of a novel and improved process for the economical manufacture of the complex, sodium-rare earth metal fluorides from relatively inexpensive raw materials. A further object is the provision of an improved economical process by which rare earth metal oxides may be converted into the complex, sodium-rare earth metal fluorides. Still another object is the provision of a process by which mixed or selected rare earth metal oxides may be reacted with natural, purified or synthetic cryolite to yield the complex sodium-rare earth fluoride, without substantial loss of any of the desired product.

In accordance with the process of the present invention, one or more of the rare earth metal oxides, comprising the oxides of those elements having atomic numbers from 57 to 71, and conveniently derived from bastnasite, are thoroughly mixed with two or more molecular equivalents of cryolite and are then subjected to heating over a somewhat prolonged period at a sufficient high temperature to cause the rare earth oxides to react with the natural, purified or synthetic cryolite to form the desired complex, sodium-rare earth fluoride.

During the reaction, sodium oxide, aluminum fluoride and aluminum oxide are also formed, but the sodium oxide and aluminum fluoride may be substantially completely removed, leaving only a minor and non-deleterious amount of aluminum oxide in the complex.

While mixed rare earth oxides are the preferred starting material, purified or selectively separated rare earth oxides may also be used, such as cerium oxide, or a mixture of some or all of the lanthanum, neodymium and praesodymium oxides, but such purified oxides do not normally present any advantage, and are disadvantageous by reason of the relatively great expense involved in effecting the separation of the rare earth metals from each other. Consequently, it is preferred to utilize the rare earth oxides in the ratio in which they normally occur in the natural ore.

Instead of utilizing the mixed rare earth oxides, it is also possible to utilize relatively pure bastnasite ore, the mixed rare earth fluocarbonate and/or carbonate, without preliminary calcination.

Cryolite is sodium aluminum fluoride, and in its naturally occurring state contains substantial amounts of fluorspar or siderite, together with minor amounts of silica. Typically, it contains about 70% cryolite, about 25% siderite or fluorspar and a few percent of silica and other impurities. In most uses for cryolite, it must be purified; and beneficiated cryolite typically contains 90% or more of cryolite, with the remainder being principally fluorspar and a minor amount of silica, and in general, special attention is usually paid to the removal of its siderite content, which is deleterious in aluminum metallurgy. However, for the purposes of the present invention, normal amounts of siderite and/or fluorspar are not deleterious, although a more concentrated form of the sodium-rare earth fluoride complex is produced where the beneficiated cryolite or synthetic cryolite is used as one of the starting materials.

The cryolite and rare earth oxides for use in the present process are preferably in a relatively finely divided state, and while no particular degree of fineness is required, it is possible to utilize material which will pass a 200 mesh seive. Cryolite of this degree of fineness can often be obtained at a lower price than cryolite which is coarser, and is equally suited for use in the process of the present invention.

In order to promote the reaction and to insure that it is uniformly carried to completion, the starting materials are thoroughly mixed while being subjected to heating. A rotary kiln serves as a convenient means of insuring that the ingredients are thoroughly and continually mixed and properly heated over an extended period of time.

Temperatures of approximately 1300° C. are required for the reaction of the ingredients to take place, and while higher temperatures may be used without serious loss, they present no advantage, and temperatures below 1290° C. require prolonged and uneconomical periods of heating with the danger that temperatures much below 1290° C. do not effect the reaction.

Using temperatures of about 1300° C. the time of heating should be at least 15 minutes and a minimum of about 30 minutes is found to be most satisfactory, insuring substantially complete volatilization of the unwanted reaction products, sodium oxide and aluminum fluoride.

Thus the preferred conditions for the reaction of the cryolite and rare earth oxide are 1 mole of rare earth oxide to two moles of cryolite, heated with constant mechanical agitation and mixing to a temperature of 1300° C. or more for a minimum period of 30 minutes.

The reaction of the process of the present invention proceeds according to the following equation:

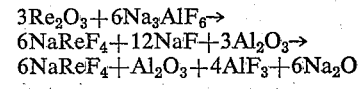

$$3Re_2O_3 + 6Na_3AlF_6 \rightarrow$$
$$6NaReF_4 + 12NaF + 3Al_2O_3 \rightarrow$$
$$6NaReF_4 + Al_2O_3 + 4AlF_3 + 6Na_2O$$

It will be understood that the foregoing general description and the following detailed description as well are exemplary and explanatory of the invention but are not restrictive thereof.

*Example 1*

A rotary kiln, charged with a mixture of rare earth oxides and beneficiated cryolite containing about 90% sodium aluminum fluoride ($Na_3AlF_6$) with minor impurities such as a few percent of siderite and/or fluorspar and usually a small amount of silica, is heated and maintained at a temperature approximating 1300° C. for at least 30 minutes, while the kiln is continuously rotated.

The rare earth oxides are preferably a natural mixture of the oxides of the rare earth elements having atomic numbers from 57 to 71 and may be obtained by calcining bastnasite. Such a mixture of rare earth oxides, resulting from the calcination of bastnasite, is composed principally of cerium oxide, and preferably at least 50% cerium oxide, with lesser amount of some of the other rare earth oxides. A typical analysis if such a natural mixture of the rare earth oxide content is:

| | Percent |
|---|---|
| Cerium oxide, $CeO_2$ | 52.3 |
| Lanthanum oxide, $La_2O_3$ | 22.3 |
| Neodymium oxide, $Nd_2O_3$ | 14.0 |
| Praesodymium oxide, $Pr_6O_{11}$ | 4.8 |
| Samarium oxide, $Sm_2O_3$ | 0.77 |
| Eruopium oxide, $Eu_2O_3$ | 0.17 |
| Gadolinium oxide, $Gd_2O_3$ | 0.23 |
| Dysprosium oxide, $Dy_2O_3$ | 0.06 |
| Terbium oxide, $Tb_4O_7$ | 0.01 |
| Yttrium oxide, $Y_2O_3$ | 0.11 |
| Miscellaneous impurities | Remainder |

(Yttrium is not a rare earth metal, but commonly occurs with the rare earth metals and does not interfere with their normal use in the present invention.)

The charge to the rotary kiln comprises:

| | Kg. |
|---|---|
| Mixed rare earth oxides | 1000 |
| Beneficiated cryolite | 1290 to 1400 |

As the kiln charge is heated and mixed by rotation for 15 and for preferably 30 or more minutes at about 1300° C. or somewhat higher temperatures, the mixed rare earth metal oxides react with the cryolite and form both sodium oxide and aluminum fluoride, both of which are volatile at the temperature of heating, and are thus removed from the mixture during the heating process. If necessary or if desired, the sodium oxide and aluminum fluoride may be recovered by condensation.

Higher temperature may be used for shorter periods of time, or longer periods of time may be used due to the substantially non-volatile nature of the mixed rare earth oxides, the cryolite and the resulting sodium rare earth fluorides, but the temperature of heating ordinarily must be at least 1290° C.

Small excesses of cryolite do not substantially harm and merely result in the final product being less concentrated than would otherwise be the case. Likewise, an excess of the rare earth oxides produces a completely useful mixture but includes some unconverted rare earth oxides which would not be as completely utilized in the ultimate use of the product as would be the case with the complex sodium-rare earth fluorides.

After the mixture has been thoroughly reacted in the kiln, it may be discharged from the kiln and is substantially composed of the complex sodium-rare earth fluorides, the rare earths occurring in substantially the same relative proportions as they were found in the mixed oxides used as the charge to the kiln. The sodium-rare earth fluoride is used as an addition agent in the production of steel, copper and other non-ferrous alloys.

*Example 2*

Natural cryolite may also be used in a similar manner and is charged to the rotary furnace along with mixed rare earth oxides, usually comprising the mixed rare earth oxides in their naturally occurring proportions and derived from the calcination of bastnasite. The natural cryolite comprises about 70% sodium aluminum fluoride ($Na_3AlF_6$), with about 25% of siderite or fluorspar, or a mixture of siderite and fluorspar and with a few percent of silica and other harmless impurities.

The natural cryolite is preferably relatively fine, and may even be the waste, almost dust-like cryolite which is rejected in the preparation of cryolite for aluminum metallurgy, or may be crude cryolite which has been crushed and preferably passes a ¼" screen.

A typical charge, dependent somewhat upon the purity of the cryolite comprises:

| | Kg. |
|---|---|
| Mixed rare earth oxides | 1000 |
| Natural cryolite | 1800 |

This charge is heated in the rotary kiln for a minimum time of about 30 minutes at a temperature of at least about 1300° C., which time will vary somewhat dependent upon the particular design and operating conditions of the kiln, and may be extended within reasonable limits without impairment of the yield or nature of the product.

At the completion of the heating and mixing in the rotary kiln, the complex, sodium-rare earth fluoride has been formed, the excess sodium fluoride and aluminum fluoride have been volatilized and there remains only a small amount of impurities, such as silica, alumina, iron compounds and calcium compounds which are not normally objectionable in the use of the sodium-rare earth fluoride.

Where the cryolite has a high fluorspar content, some of the product often is calcium-rare earth fluoride which acts similarly to the corresponding sodium complex.

*Example 3*

Instead of using mixed rare earth oxides which have been prepared by calcining bastnasite, as in Example 1, the mixture charged to the rotary kiln may comprise:

| | Kg. |
|---|---|
| Bastnasite | 1410 |
| Beneficiated cryolite (90%) | 1350 |

This mixture is likewise heated for 30 to 40 minutes or more in a rotary kiln at a temperature approximating or somewhat exceeding 1300° C.

In the initial portion of the time of heating the bastnasite is calcined to form the mixed rare earth oxides, and simultaneously the oxides react with the cryolite to form the sodium-rare earth fluorides. Some of the fluorine naturally contained in the bastnasite, which is a fluorocarbonate, reacts with a portion of the alumina produced by the reaction, forming aluminum fluoride, and thus somewhat less aluminum oxide remains in the finished product than is the case with Example 1.

*Example 4*

Special sodium-rare earth fluorides may be prepared for certain uses from selected rare earths, although for most purposes the rather large additional expense of separating the rare earths is unnecessary. As an example of such a special preparation, the formation of the sodium-cerium fluoride is illustrative.

The mixture charged to the rotary kiln comprises:

| | Kg. |
|---|---|
| Cerium oxide ($Ce_2O_3$) | 100 |
| Beneficiated cryolite (90%) | 133 |

The mixture, after heating for at least 30 minutes at temperature approximating or exceeding 1300° C. yields about 140 kg. of sodium cerium fluoride.

*Example 5*

In a manner exactly similar to that of Example 1, the mixture charged to the kiln comprises:

| | Kg. |
|---|---|
| Bastnasite | 1000 |
| Synthetic cryolite | 820 |

*Example 6*

Similarly, the rare earth oxide mixture from bastnasite may be used with synthetic cryolite, in which case the mixture charged in accordance with the conditions of Example 1, would be:

| | Kg. |
|---|---|
| Mixed rare earth oxides | 1000 |
| Synthetic cryolite | 1190 |

*Example 7*

A 100 kg. mixture of cerium oxide and lanthanum oxide from which the other and more valuable rare earth oxides have been removed and comprising

| | Percent |
|---|---|
| Cerium oxide | About 68 |
| Lanthanum oxide | About 28 |
| Impurities | About 4 | is charged to the kiln with about 125 kg. of synthetic cryolite and subjected to the process conditions of Example 1, yields a mixed sodium-cerium-lanthanum fluoride which is useful where the absence of neodymium and other rare earth metals is desired.

In an exactly similar manner, the sodium rare earth fluoride complex of other rare earth metals, or of selected mixtures of rare earth metals, may be produced, utilizing the desired rare earth metal oxide in the initial charge.

While it is preferred to use approximately two moles of cryolite to each mole of rare earth oxide, additional amounts of cryolite are not ordinarily deleterious, although they do increase the cost of the useful product.

The invention in its broader aspects is not limited to the specific steps, processes and compositions shown and described but departures may be made therefrom within the scope of the accompanying claims without departing from the principles of the invention and without sacrificing its chief advantages.

What is claimed is:

1. The process of forming a complex sodium-rare earth fluoride which comprises mixing and heating cryolite and at least one rare earth oxide at a temperature of at least 1290° C. until the complex has been formed and the volatile reaction products have been substantially removed by volatilization.

2. The process of forming a complex sodium-rare earth fluoride which comprises mixing and heating one mole of mixed rare earth oxides with at least two moles of cryolite at a temperature of at least 1290° C. until the reaction is substantially complete.

3. The process of forming a complex sodium-rare earth fluoride according to claim 1, in which the cryolite is beneficiated cryolite and contains at least 90% cryolite.

4. The process of forming a complex sodium-rare earth fluoride according to claim 1, in which the cryolite is synthetic cryolite and contains at least 95% cryolite.

5. The process of forming a complex sodium-rare earth fluoride according to claim 1, in which the mixed rare earth oxides are in their naturally occurring ratios and include at least 50% cerium oxide.

6. The process of forming a complex sodium-rare earth fluoride which comprises mixing one mole finely divided mixed rare earth oxides and two moles of cryolite and maintaining them at a temperature in excess of 1290° C. for a period of at least 15 minutes to complete reaction of the cryolite with the oxide and to remove substantially all of the aluminum fluoride and sodium oxide formed by the reaction.

7. The process of forming a complex sodium-rare earth metal fluoride which comprises mixing one mole of bastnasite and two moles of cryolite, heating them to 1300° C. whereby the bastnasite is calcined to yield mixed rare earth oxides and continuing the mixing and heating for at least fifteen minutes.

References Cited in the file of this patent

UNITED STATES PATENTS

| 2,793,097 | McKenna | May 21, 1957 |
| 2,812,237 | Wainer | Nov. 5, 1957 |
| 2,900,231 | Kremers et al. | Aug. 18, 1959 |

OTHER REFERENCES

Hopkins: Chemistry of the Rarer Elements, page 98 (1923), Heath and Co., N.Y.

Sneed-Brasted: Comprehensive Inorganic Chemistry, vol. 4, page 146 (1955), Van Nostrand Co., Princeton, N.J.